US011999128B2

(12) United States Patent
Bauwens

(10) Patent No.: US 11,999,128 B2
(45) Date of Patent: Jun. 4, 2024

(54) METHOD OF ALIGNING AIR BURST ON BAG WICKETER PROCESSING LINE

(71) Applicant: Paper Converting Machine Company, Green Bay, WI (US)

(72) Inventor: Frank Bauwens, Moorsel (BE)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 18/106,058

(22) Filed: Feb. 6, 2023

(65) Prior Publication Data

US 2023/0249428 A1 Aug. 10, 2023

Related U.S. Application Data

(60) Provisional application No. 63/308,301, filed on Feb. 9, 2022.

(51) Int. Cl.
*B31B 70/16* (2017.01)
*B31B 70/98* (2017.01)

(52) U.S. Cl.
CPC ............ *B31B 70/984* (2017.08); *B31B 70/16* (2017.08)

(58) Field of Classification Search
CPC ....... B31B 70/16; B31B 70/984; B31B 70/04; B31B 70/26; B31B 70/36; B31B 70/64; B31B 70/645
USPC .......................................................... 493/186
See application file for complete search history.

(56) References Cited

U.S. PATENT DOCUMENTS

| | | | | |
|---|---|---|---|---|
| 3,805,683 A | | 4/1974 | Hook | |
| 4,231,558 A | * | 11/1980 | Aterianus | B65H 29/51 271/81 |
| 4,286,907 A | | 9/1981 | Houle et al. | |
| 4,459,172 A | | 7/1984 | Achelpohl et al. | |
| 4,573,955 A | | 3/1986 | Mory et al. | |
| 4,631,905 A | * | 12/1986 | Maloney | B65D 77/28 53/239 |
| 4,674,268 A | * | 6/1987 | Gavronsky | B29C 44/182 141/10 |
| 5,230,688 A | | 7/1993 | Hatchell et al. | |
| 5,833,107 A | * | 11/1998 | Terranova | B65H 23/1886 493/193 |
| 6,003,288 A | * | 12/1999 | Sperry | B29C 66/4322 53/562 |

(Continued)

FOREIGN PATENT DOCUMENTS

WO WO-2022094337 A1 * 5/2022 ............. B65D 27/14

*Primary Examiner* — Sameh Tawfik
(74) *Attorney, Agent, or Firm* — Thompson Coburn LLP

(57) ABSTRACT

A method includes a bag forming process with a bag wicketing machine having a sideweld seal head that receives plies of web material, conveys the plies through the sideweld seal head, seals the plies together, cuts the plies to form a bag blank, and moves the bag blank onto an exit conveyor. Pressurized air from nozzles of a pneumatic blow down bar is directed at the bag blank. With an energized laser operatively mounted on the pneumatic blow down bar, the position of the pneumatic blow down bar relative to the bag blank and the exit of the sideweld seal head is adjusted so that a beam emanating from the laser is positioned against the bag blank at a desired location where pressurized air from the nozzles of the pneumatic blow down bar is directed against the bag blank and forces the bag blank into engagement with the conveyor.

25 Claims, 5 Drawing Sheets

(56) References Cited

U.S. PATENT DOCUMENTS

| | | | | |
|---|---|---|---|---|
| 6,623,412 | B2 * | 9/2003 | Terranova | B31B 70/006<br>242/417.1 |
| 6,625,517 | B1 * | 9/2003 | Bogdanov | B29C 66/8161<br>700/193 |
| 8,020,358 | B2 * | 9/2011 | Sperry | B29C 66/87443<br>53/562 |
| 10,786,960 | B2 * | 9/2020 | Sperry | B65D 81/03 |
| 10,934,033 | B2 * | 3/2021 | Ichikawa | B65B 9/2014 |
| 11,858,712 | B2 * | 1/2024 | Wetsch | B32B 7/05 |
| 2008/0002137 | A1 * | 1/2008 | Kim | G02F 1/1341<br>349/187 |
| 2008/0250753 | A1 * | 10/2008 | Sperry | B29C 65/223<br>53/403 |
| 2017/0152115 | A1 * | 6/2017 | Montoya | B65G 51/00 |
| 2017/0274613 | A1 * | 9/2017 | Stafford, III | B31B 70/26 |
| 2021/0138758 | A1 * | 5/2021 | Rapparini | B31B 70/642 |
| 2023/0256698 | A1 * | 8/2023 | Totani | B29C 66/0326<br>493/199 |

* cited by examiner

METHOD OF ALIGNING AIR BURST ON BAG WICKETER PROCESSING LINE

RELATED APPLICATION DATA

This application claims priority benefit of U.S. provisional application Ser. No. 63/308,301, filed Feb. 9, 2022, the disclosure of which is incorporated by reference herein.

BACKGROUND AND SUMMARY

The present disclosure is directed to a bag wicketer processing line, and more in particular, the set-up of such a processing line prior to normal production operation.

DETAIL DESCRIPTION

Figure 1:
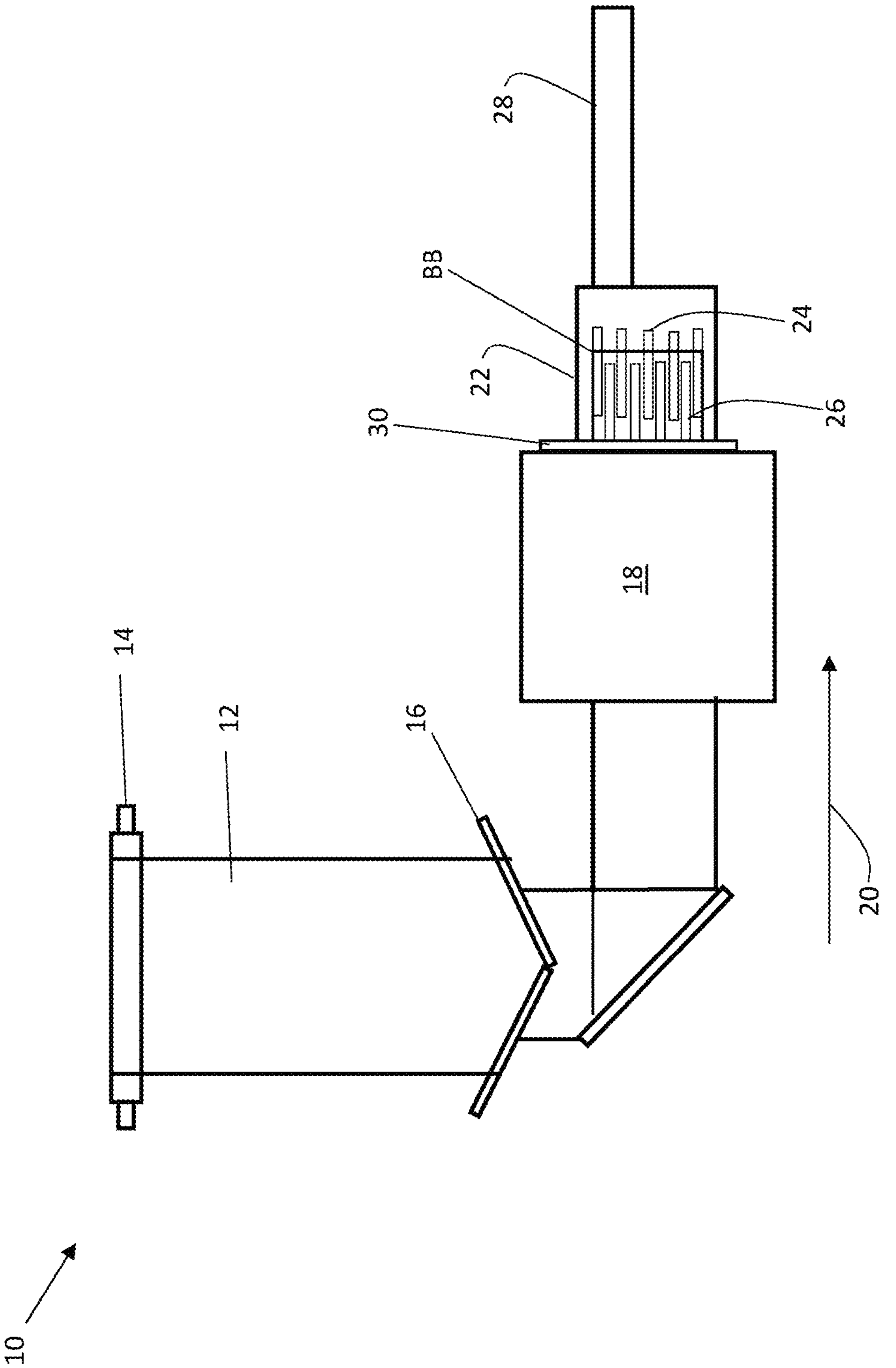
FIG. 1 is a schematic diagram of a bag wicketer processing line.
Figure 2:
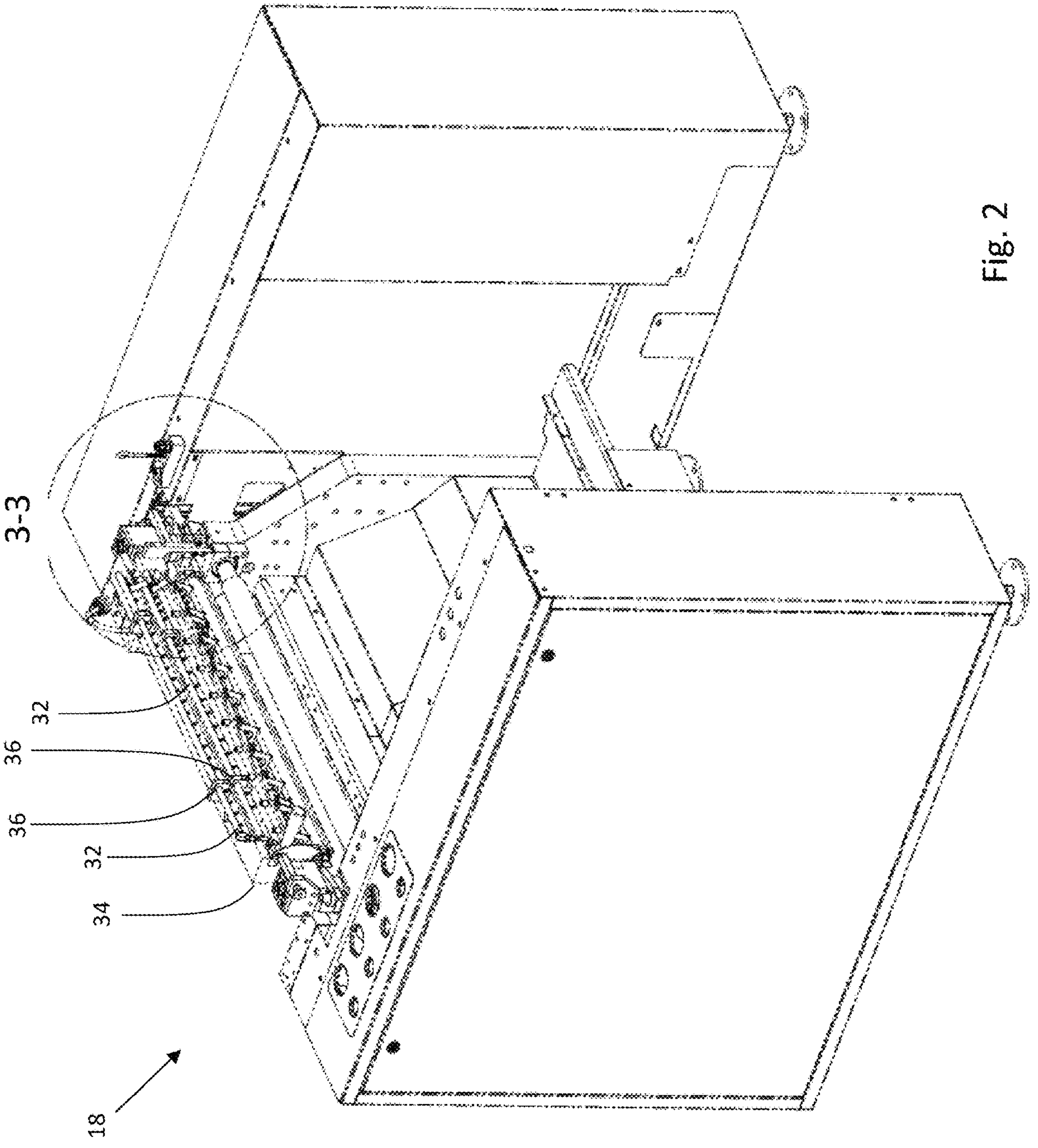
FIG. 2 is a perspective view of a sideweld seal head unit of the bag wicketer processing line.
Figure 3:
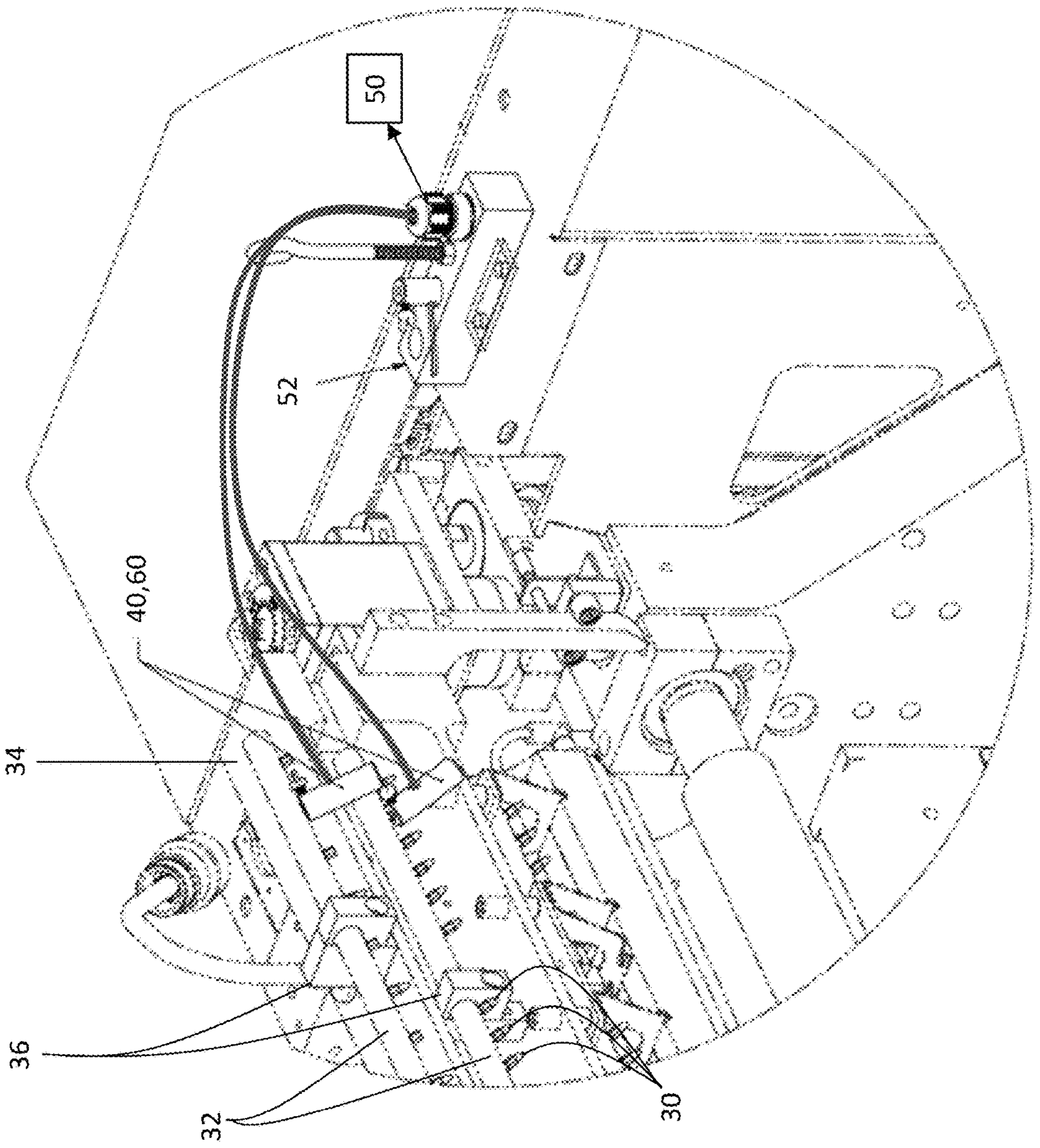
FIG. 3 is partial, enlarged view of detail area 3-3 of FIG. 2.
Figure 4:
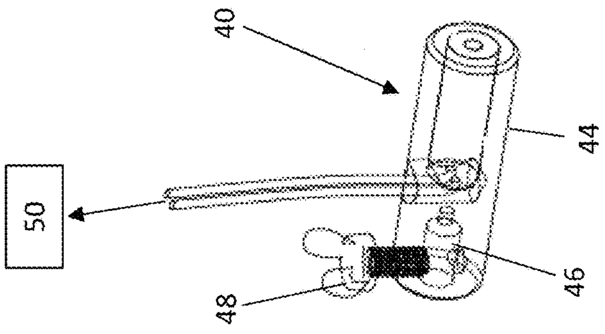
FIG. 4 is a perspective view of a laser.
Figure 5:
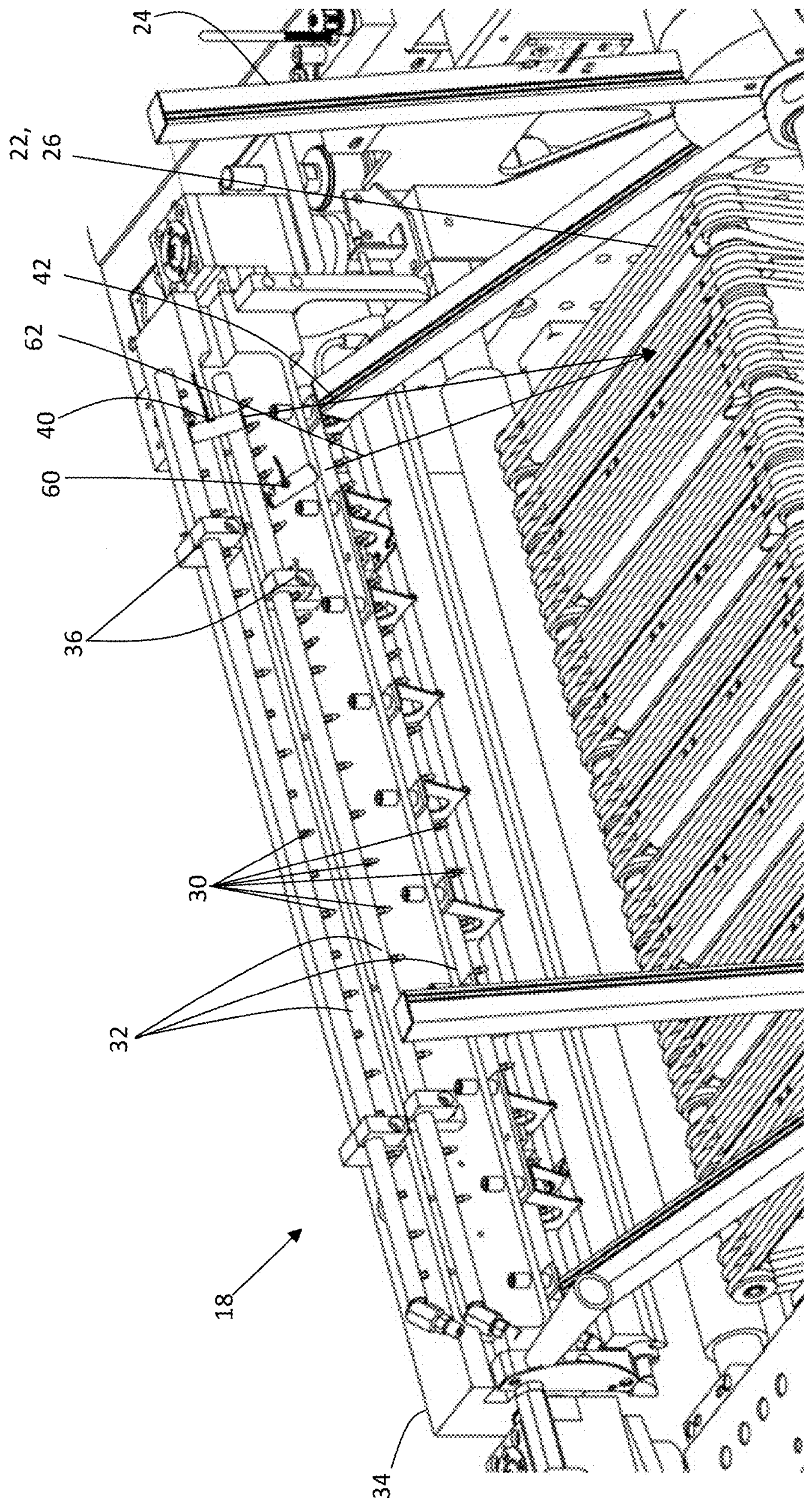
FIG. 5 is a perspective view of the exit of the sideweld seal head of FIG. 2 showing pneumatic blow down bars and the exit conveyor at the exit of the sideweld seal head.

A bag wicketer processing line may utilize pressurized air to aid in the delivery of bag blanks to an exit conveyor. In one aspect, the pressurized air may facilitate the transition of bag blanks from the sideweld seal head to an exit conveyor and a wicket arm portion of the exit conveyor at an exit of the sideweld seal head. In another aspect, the pressurized air may facilitate the transition of bag blanks through processing equipment on the processing line, including a conveyor. In the example of a processing line with a sideweld seal head, the pressurized air may be delivered adjacent the exit of the sideweld seal head via one or more pneumatic blow down bars. The pneumatic blow down bars may be mounted on the sideweld seal head. Pressurized air may be exhausted from nozzles formed on the pneumatic blow down bar and directed toward the advancing film plies or bag blank as it moves onto the exit conveyor. The pressurized air flow from the nozzles of the pneumatic blow down bar forces the advancing film plies or bag blank downward on the exit conveyor and/or wicket arm portion of the exit conveyor to prevent the leading edge of the plies or bag blank from lifting off the exit conveyor and folding backward. The pressurized air also helps eliminate wrinkles near the seal roll, which may compromise seal quality. Finally, the pressurized air helps the plies or bag blanks transition from the exit of the sideweld seal head to the exit conveyor and to the vacuum arms of the wicket arm portion in a straight manner without skewing.

As disclosed in greater detail below, a laser may be used to align the direction of flow of the pressurized air from one or more of the pneumatic the blow down bars at the exit of the sideweld seal head to facilitate set-up prior to normal production operation of the bag wicketer processing line.

The laser may be a Class 1 laser, or another directional light generating device may be used. The beam emanating from the laser may be a point or a line. The laser or directional light generating device may be mounted directly to one or more of the pneumatic blow down bars or may be removably attached to a nozzle of the pneumatic blow down bar. Accordingly, each laser or direction light generating device may be pointed in the same direction as the discharge from the nozzles on the respective pneumatic blow down bar and provide a visual aid to the operator in adjusting the pneumatic blow down bar so that the pressurized air is directed to a desired location on the plies or bag blank to force the plies or bag blank into engagement with the exit conveyor and the wicket arm portion. The timing for when the laser is energized, and duration the laser is energized may be directly tied to the timing of the discharge of pressurized air from the nozzles of the pneumatic blow down bars via a control of the processing line, and may be based upon at least one of the speed of advancement of the plies or bag blanks, the size of the bag blanks, the overall cycle time of the sideweld seal head, the exit conveyor speed, and/or the wicket arm portion speed. The visual aid provided by the laser is intended to illustrate to machine operators how the discharge of pressurized air from the nozzles of the pneumatic blow down bars are affecting bag delivery. The visual aid provided by the laser is intended to facilitate set up of the processing line prior to normal production operations and may be used during normal production operations as a visual inspection means to ensure proper operation of the processing line.

FIG. 1 shows a general overview of a bag wicketer processing line 10. A web 12 of material may be unwound from an unwind stand 14. The web 12 of material may be conveyed to a former 16. With the former 16, the web 12 of material may be folded over onto itself. For instance, lateral side edges of the web may be folded so the lateral side edges are adjacent or even to each other, as may be required by the product format. The lateral side edges may also be spaced apart, as desired. The folded-over web 12 may then be directed to the sideweld seal head 18 with the web moving in a direction of travel as shown by reference character 20. In the alternative, two or more plies may be unwound from respective unwind stands and directed to the sideweld seal head in a side by side arrangement, as may be desired. Depending upon the format of the desired bag blank BB, the folded-over web or plies may be folded, sealed, perforated or punched while being conveyed to the sideweld seal head 18. A seal may be formed in folded-over web or plies. The seal may extend in a direction transverse to the direction of travel of the folded-over web. The seal may be formed with the sideweld seal head 18. The web or plies may then be cut at a trailing edge of the seal to form a bag blank BB. The sideweld seal head may cut and weld the side seam simultaneously. The bag blanks BB may then be moved from the exit of the sideweld seal head to the exit conveyor 22. The exit conveyor 22 may have a wicket arm portion 24 with vacuum arms interdigitated with belts 26 of the exit conveyor 22. The vacuum arms of the wicket arm portion 24 may engage the bag blanks and move the bag blanks to stacks on a downstream conveyor 28.

Pressurized air from nozzles 30 of one or more pneumatic blow down bars 32 may be directed toward the bag blank BB entering the exit conveyor 22, for instance, from the exit of the sideweld seal head 18. Making reference to FIGS. 2-5, the pneumatic blow down bars 32 may be mounted to a subassembly 34 at the exit of the sideweld seal head 18 with one or more clamps 36, for instance, a split block clamp, that may be loosened and tightened to adjust the rotational position and translational position of the blowdown bar relative to the bag blank BB at the entrance of the exit conveyor and the exit of the sideweld seal head. The subassembly 34 may also be movable as needed to adjust the position of the pneumatic blow down bars 32 relative to the exit of the sideweld seal head 18 and the exit conveyor 22.

A laser 40 operatively mounted on the pneumatic blow down bar 32 may be energized to produce a beam 42 emanating from the laser. The laser 40 may removably attached to a nozzle 30 of the pneumatic blow down bar 32 or removably attached to the pneumatic blow down bar itself, so the laser may be removed after set-up of the processing line to reduce repeated vibration during normal production operations. The laser 40 may also be a more permanent structure of the pneumatic blowdown bar 32 and may be energized as needed during normal production operations so the operator may perform a visual inspection during operation. In each case, the laser 40 is aligned with the nozzles 30 of the pneumatic blow down bar 32 so that the beam 42 emanating from the laser indicates a direction of flow of the pressurized air from the nozzles 30 of the pneumatic blow down bar 32. The laser 40 may have a casing 44 with an bore 46 sized to fit over a nozzle 30 of the pneumatic blowdown bar 32. The laser 40 may be held in place on the nozzle 30 with a set screw 48. The laser 40 may be energized with a power source controlled from a control 50 associated with the processing line. The lasers may be stored in a storage magazine 52 located near the exit of the sideweld seal head.

With the laser 40 energized, the operator may adjust the position of the pneumatic blow down bar 32 relative to the bag blank BB, the exit of the sideweld seal head 18, and/or the entrance of the exit conveyor 22 in a manner such that the beam emanating 42 from the laser 40 is positioned against the bag blank at a desired location where pressurized air from the nozzles 30 of the pneumatic blow down bar(s) 32 is directed against the bag blank and forces the bag blank into engagement with the belts 26 of the exit conveyor 22 at the entrance of the exit conveyor. In addition, with the laser 40 energized, the operator may adjust the position of the pneumatic blow down bar 32 relative to the bag blank BB, the exit of the sideweld seal head 18, and/or the entrance of the exit conveyor 22 in a manner such that the beam emanating 42 from the laser 40 is positioned against the bag blank at a desired location where pressurized air from the nozzles 30 of the pneumatic blow down bar(s) 32 is directed against the bag blank with the bag blank in engagement with the wicket arm portion 24 of the exit conveyor.

To complete setup of the processing line, the machine operator may then set an interval for energizing the laser 40 and directing pressurized air from the nozzles 30 of the pneumatic blow down bar 32 against the bag blank BB based at least in part upon a speed of advancement of the web, plies or bag blanks, the size of the bag blanks, the overall cycle time of the sideweld seal head, the exit conveyor speed, and/or the wicket arm portion speed. The machine operator may set the interval for energizing the laser 40 and directing pressurized air from the nozzles 30 of the pneumatic blow down bar 32 against the bag blank by energizing the laser and directing pressurized air from the nozzles of the pneumatic blow down bar at the same time and/or the same duration. In doing so, the light emanating from the laser 40 simulates the flow of pressurized air from the nozzles 30 of the pneumatic blow down bar 32.

The processing line may be operated intermittently to allow the machine operator to make adjustments to the pneumatic blow down bar 32 to align the directional flow of pressurized air. The operator may concurrently make other adjustments to the processing line in terms of the speed of advancement of the plies or folded over web, the overall cycle time of the sideweld seal head, a speed of the belts 26 of the exit conveyor 22, and a speed of the wicket arm portion 24 of the exit conveyor. The operator may energize the laser 40 as necessary to simulate the effect of the pressurized air and the location of the pressurized air relative to the bag blank BB.

Depending upon the number of pneumatic blow down bars 32 on processing line 10 at the entrance of the exit conveyor 22 or as the case may be the sideweld seal head 18, the machine operator may align a direction of pressurized air from the nozzles 30 of other pneumatic blow down bars 32 by energizing one or more lasers 40,60 operatively mounted on the other pneumatic blow down bar 32 of the sideweld seal head (for instance, a second laser on a second pneumatic blow down bar, or moving the first laser to the other pneumatic blow down bar). The lasers 40,60 may be similarly configured to be removably attached to the nozzle of the one or more pneumatic blow down bars. The other laser 60 may be aligned with the nozzles 30 of the respective pneumatic blow down bar 32 so that the beam 62 emanating from the other laser 60 indicates a direction of flow of the pressurized air from the nozzles of the other pneumatic blow down bar. With the other laser 60 energized, the machine operator may adjust the position of the other pneumatic blow down bar 32 relative to the bag blank BB and the exit of the sideweld seal head such that the beam 62 emanating from the respective laser 60 is positioned against the bag blank BB at another desired location where pressurized air from the nozzles 30 of the respective pneumatic blow down bar 32 is directed against the bag blank BB and forces the bag blank BB into engagement with the belts 26 of the exit conveyor 22 at the entrance of the conveyor. In connection with the adjustment of the other pneumatic blowdown bar 32, the machine operator may also adjusting the position of the respective pneumatic blow down bar relative to the bag blank BB with the other 60 energized so that the beam 42,62 emanating from the respective laser is positioned against the bag blank at a desired location where pressurized air from the nozzles 30 of the respective pneumatic blow down bar 32 is directed against the bag blank with the bag blank in engagement with the wicket arm portion 24 of the exit conveyor 22.

In connection with the other pneumatic blow down bar 32, the machine operator may complete the set-up for the processing line by setting an interval for energizing the other laser 60 and directing the pressurized air from the other pneumatic blow down bar against the bag blank BB at least in part upon a speed of advancement of the plies through the side weld seal head, the size of the bag blanks, the overall cycle time of the sideweld seal head, the exit conveyor speed, and/or the wicket arm portion speed. The other laser 60 and air pulse from the other pneumatic blow down bar may be interfaced with the control 50. The machine operator may set the interval for energizing the other laser 60 and directing pressurized air from the nozzles 30 of the other pneumatic blow down bar(s) 32 against the bag blank BB by energizing the other laser and directing pressurized air from the nozzles of the other pneumatic blow down bar(s) at the same time and/or the same duration. The light emanating from the other laser simulates the flow of pressurized air from the nozzles of the other pneumatic blow down bar.

Figure 6:
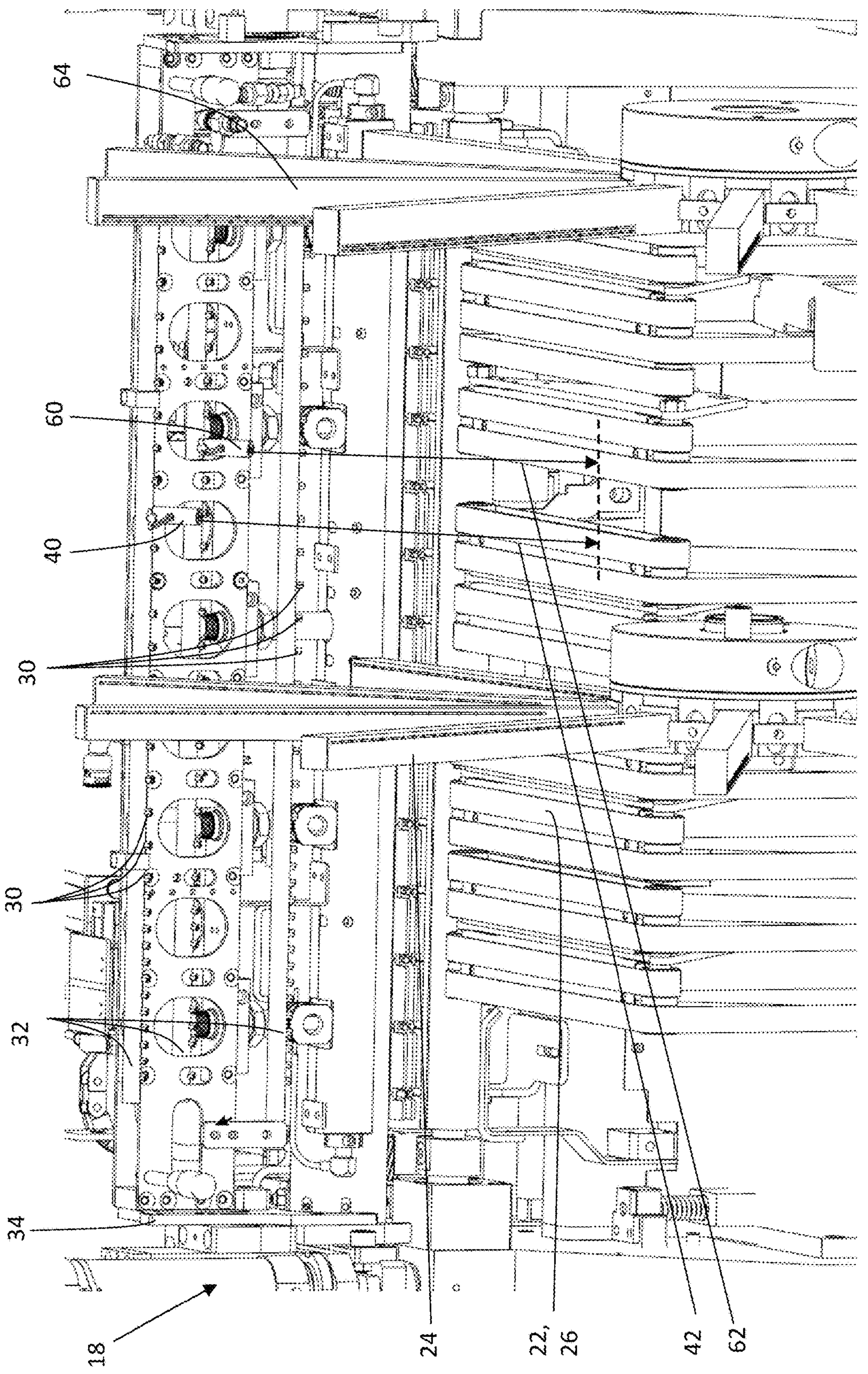
FIG. 6 is a plan view of an exit of the sideweld seal head of FIG. 2 showing an exit conveyor of the bag wicketer processing line including the wicket arm portion of the bag wicketer processing line and a beam emanating from the laser across the exit conveyor and wicket arm portion.

With the air pulse and laser associated with the one or more pneumatic blow down bars, the operator may ensure that the bag blank BB is sufficiently flat and unwrinkled so that the bag blank transitions properly from the exit of the sideweld seal head to the exit conveyor, and as applicable, the wicket arm portion 24 of the exit conveyor 22. The vacuum arms of the wicket arm portion 24 of the exit conveyor 22 may engage with the bag blank to keep it smooth and flat as the arms lift the bag blank from the belts 26 of the exit conveyor and move the bag blanks to the downstream conveyor 28. The vacuum arms may have one or more rows of vacuum holes depending upon the format of the bag blank. For instance, in FIG. 6, the vacuum arm 64 that engages the top of the bag blank has two rows of vacuum holes that engages the top of the bag blank. As mentioned before, the former may be configured to fold over the web of material so the lateral side edges are adjacent to each other but not even with each depending upon the format of the bag blank. The machine operator may adjust the position of one or more pneumatic blow down bars 32 so the flow of pressurized air at the bag blank BB allows the bag blank to remain flat on the vacuum arms as the vacuum arms engage the bag blank, especially the top edge engaging vacuum arm 64 at which point the flow pressurized air may be shut-off to allow the vacuum arms to continue to engage the bag blank without interference from the pressurized air. Energizing the laser 40,60 during the period of flow of the pressurized air onto the bag blank provides the machine operator with a visual indication of the air pulse relative to the rotation of the vacuum arms, which can assist the machine operator in set-up of the processing line.

Depending upon the mounting configuration of the lasers and the pneumatic blowdown bar, during normal production operations, the machine operator may also energize the lasers to provide a periodic visual inspection means of the direction of pressurized air flow from the pneumatic blow down bar as many desired The embodiments were chosen and described in order to best explain the principles of the disclosure and their practical application to thereby enable others skilled in the art to best utilize said principles in various embodiments and with various modifications as are suited to the particular use contemplated. As various other modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of initiating a bag forming process from a stopped state to a running state in a bag wicketing processing line, the method comprising the steps of:

providing a bag wicketing machine, the bag wicketing machine having a sideweld seal head adapted and configured to: (i) receive first and second plies of material, (ii) convey the plies of material in a direction of advancement from an entrance of the sideweld seal head to an exit of the sideweld seal head; (iii) seal the plies together with the seal extending in a direction transverse to the direction of advancement, and (iv) cut the plies at a trailing edge of the seal to form a bag blank;

operating the sideweld seal head to direct the first and second plies of material through the sideweld seal head such that the bag blank extends from the exit of the sideweld seal head onto a conveyor at the exit of the sideweld seal head;

directing pressurized air from nozzles of a pneumatic blow down bar at the bag blank extending from the exit of the sideweld seal head onto the conveyor;

energizing a laser operatively mounted on the pneumatic blow down bar to produce a beam emanating from the laser, the laser being aligned with the nozzles of the pneumatic blow down bar, wherein the beam emanating from the laser indicates a direction of flow of the pressurized air from the nozzles of the pneumatic blow down bar;

with the laser energized, adjusting the position of the pneumatic blow down bar relative to the bag blank and the exit of the sideweld seal head in a manner, wherein the beam emanating from the laser is positioned against the bag blank at a desired location where pressurized air from the nozzles of the pneumatic blow down bar is directed against the bag blank and forces the bag blank into engagement with the conveyor; and setting an interval for energizing the laser and directing pressurized air from the nozzles of the pneumatic blow down bar against the bag blank based on at least one of a speed of advancement of the plies through the sideweld seal head, a size of the bag blank, an overall cycle time of the sideweld seal head, and a speed of the conveyor.

2. The method of claim 1, further comprising:

operating a wicket arm portion of the conveyor to engage the bag blank; and the step of adjusting the position of the pneumatic blow down bar relative to the bag blank includes adjusting the position of pneumatic blow down bar with the laser energized so that the beam emanating from the laser is positioned against the bag blank at a desired location where pressurized air from the nozzles of the pneumatic blow down bar is directed against the bag blank with the bag blank in engagement with the wicket arm portion of the conveyor.

3. The method of claim 1, wherein the step of setting the interval for energizing the laser and directing pressurized air from the pneumatic blow down bar against the bag blank includes energizing the laser and directing pressurized air from the pneumatic blow down bar at the same time.

4. The method of claim 1, wherein the step of setting the interval for energizing the laser and directing pressurized air from the pneumatic blow down bar against the bag blank includes energizing the laser and directing pressurized air from the pneumatic blow down bar for the same duration.

5. The method of claim 1, further comprising:

directing pressurized air from nozzles of a further pneumatic blow down bar at the bag blank extending from the exit of the sideweld seal head and onto the conveyor at the exit of the sideweld seal head;

energizing a further laser operatively mounted on the further pneumatic blow down bar to produce a beam emanating from the further laser, the further laser being aligned with the nozzles of the further pneumatic blow down bar so that the beam emanating from the further laser indicates a direction of flow of the pressurized air from the nozzles of the further pneumatic blow down bar;

with the further laser energized, adjusting the position of the further pneumatic blow down bar relative to the bag blank and the exit of the sideweld seal head such that the beam emanating from the further laser is positioned against the bag blank at a further desired location where pressurized air from the nozzles of the further pneumatic blow down bar is directed against the bag blank and forces the bag blank into engagement with the conveyor at the entrance of the conveyor; and setting an interval for energizing the further laser and directing the pressurized air from the further pneumatic blow down bar against the bag blank based on at least one of a speed of advancement of the plies through the sideweld seal head, a size of the bag blank, an overall cycle time of the sideweld seal head, and a speed of the exit conveyor.

6. The method of claim 5, further comprising:

operating a wicket arm portion of the conveyor to engage the bag blank; and the step of adjusting the position of the further pneumatic blow down bar relative to the bag blank includes adjusting the position of the further pneumatic blow down bar so that the beam emanating from the further laser is positioned against the bag blank at a desired location where pressurized air from the nozzles of the further pneumatic blow down bar is directed against the bag blank with the bag blank in engagement with the wicket arm portion of the conveyor.

7. The method of claim 5, wherein the step of setting the interval for energizing the further laser and directing pressurized air from the further pneumatic blow down bar against the bag blank includes energizing the further laser and directing pressurized air from the further pneumatic blow down bar at the same time.

8. The method of claim 5, wherein the step of setting the interval for energizing the further laser and directing pressurized air from the further pneumatic blow down bar against the bag blank includes energizing the further laser and directing pressurized air from the further pneumatic blow down bar for the same duration.

9. The method of claim 1, further comprising using a former to fold over a web onto itself to form the first and second plies.

10. A method of initiating a wicket bag forming process from a stopped state to a running state, the method comprising the steps of:

directing first and second plies toward a conveyor in a direction of travel;

sealing the first and second plies together a direction transverse to the direction of travel of the first and second plies;

cutting across the first and second plies at a trailing edge of the seal to form a bag blank;

directing pressurized air from nozzles of a pneumatic blow down bar toward the bag blank entering the conveyor;

energizing a laser operatively mounted on the pneumatic blow down bar to produce a beam emanating from the laser, the laser being aligned with the nozzles of the pneumatic blow down bar, wherein the beam emanating from the laser indicates a direction of flow of the pressurized air from the nozzles of the pneumatic blow down bar;

with the laser energized, adjusting the position of the pneumatic blow down bar relative to the bag blank and the entrance of the conveyor in a manner, wherein the beam emanating from the laser is positioned against the bag blank at a desired location where pressurized air from the nozzles of the pneumatic blow down bar is directed against the bag blank and forces the bag blank into engagement with the conveyor at the entrance of the conveyor; and setting an interval for energizing the laser and directing pressurized air from the pneumatic blow down bar against the bag blank based on at least one of a speed of advancement of the plies toward the conveyor, a size of the bag blank, an overall cycle time of sealing the plies together, and a speed of the conveyor.

11. The method of claim 10, further comprising:

repeatedly directing bag blanks onto the conveyor; and intermittently energizing the laser and directing pressurized air from the pneumatic blow down bar to each bag blank directed to the conveyor.

12. The method of claim 11, further comprising:

adjusting the position of the pneumatic blow down bar such that the beam emanating from the laser is positioned at the desired location for each bag blank entering the conveyor.

13. The method of claim 10, wherein the step of setting the interval for energizing the laser and directing pressurized air from the pneumatic blow down bar against the bag blank includes energizing the laser and directing pressurized air from the nozzles of the pneumatic blow down bar at the same time.

14. The method of claim 10, wherein the step of setting the interval for energizing the laser and directing pressurized air from the nozzles of the pneumatic blow down bar against the bag blank includes energizing the laser and directing pressurized air from the nozzles of the pneumatic blow down bar for the same duration.

15. The method of claim 10, further comprising:

operating a wicket arm portion of the conveyor to engage the bag blank; and the step of adjusting the position of the pneumatic blow down bar relative to the bag blank includes adjusting the position of pneumatic blow down bar with the laser energized so that the beam emanating from the laser is positioned against the bag blank at a desired location where pressurized air from the nozzles of the pneumatic blow down bar is directed against the bag blank with the bag blank in engagement with the wicket arm portion of the conveyor.

16. The method of claim 10, further comprising:

directing pressurized air from nozzles of a further pneumatic blow down bar at the bag blank entering the conveyor;

energizing a further laser operatively mounted on the further pneumatic blow down bar to produce a beam emanating from the further laser, the further laser being aligned with the nozzles of the further pneumatic blow down bar so that the beam emanating from the further laser indicates a direction of flow of the pressurized air from the nozzles of the further pneumatic blow down bar;

with the further laser energized, adjusting the position of the further pneumatic blow down bar relative to the bag blank and the entrance of the conveyor so that the beam emanating from the further laser is positioned against the bag blank at a further desired location where the pressurized air from the nozzles of the further pneumatic blow down bar is directed against the bag blank and forces the bag blank into engagement with the conveyor; and setting an interval for energizing the further laser and directing the pressurized air from the further pneumatic blow down bar against the bag blank based on at least one of the speed of advancement of the first and second plies toward the conveyor, a size of the bag blank, an overall cycle time of sealing the plies together, and a speed of the conveyor.

17. The method of claim 16, further comprising:

repeatedly directing bag blanks onto the conveyor; and intermittently energizing the further laser and directing pressurized air from the further pneumatic blow down bar to each bag blank directed to the conveyor.

18. The method of claim 17, further comprising:

adjusting the position of the further pneumatic blow down bar such that the beam emanating from the laser is positioned at the desired location for each bag blank entering the conveyor.

19. The method of claim 16, wherein the step of setting the interval for energizing the further laser and directing pressurized air from the further pneumatic blow down bar against the bag blank includes energizing the further laser and directing pressurized air from the further pneumatic blow down bar at the same time.

20. The method of claim 16, wherein the step of setting the interval for energizing the further laser and directing pressurized air from the further pneumatic blow down bar against the bag blank includes energizing the further laser and directing pressurized air from the further pneumatic blow down bar for the same duration.

21. The method of claim 16, further comprising:

operating a wicket arm portion of the conveyor to engage the bag blank; and the step of adjusting the position of the further pneumatic blow down bar relative to the bag blank includes adjusting the position of the further pneumatic blow down bar with the laser energized so that the beam emanating from the further laser is positioned against the bag blank at a further desired location where the pressurized air from the nozzles of the further pneumatic blow down bar is directed against the bag blank with the bag blank in engagement with the wicket arm portion of the conveyor.

22. The method of claim 16, further comprising removably attaching the further laser to a nozzle of the further pneumatic blowdown bar.

23. The method of claim 10, further comprising removably attaching the laser to a nozzle of the pneumatic blowdown bar.

24. The method of claim 10, further comprising:

unwinding a web of material from an unwind stand;

conveying the web to a former; and with the former, folding the web over on to itself to form the first and second plies.

25. The method of claim 10, further comprising:

directing the first and second plies to a sideweld seal head prior to the conveyor; and the step of sealing the plies and cutting the plies at a trailing edge of the seal to form the bag blank includes operating the sideweld seal head to seal the plies and cut the plies at the trailing edge of the seal to form the bag blank.

* * * * *